(12) United States Patent
Okamura et al.

(10) Patent No.: US 10,125,914 B2
(45) Date of Patent: Nov. 13, 2018

(54) PAN TILT DRIVE DEVICE AND CAMERA DEVICE

(71) Applicant: PANASONIC INTELLECTUAL PROPERTY MANAGEMENT CO., LTD., Osaka (JP)

(72) Inventors: Shinichiro Okamura, Fukuoka (JP); Takashi Saitou, Fukuoka (JP); Kouji Abe, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 63 days.

(21) Appl. No.: 15/422,825

(22) Filed: Feb. 2, 2017

(65) Prior Publication Data

US 2017/0254469 A1    Sep. 7, 2017

(30) Foreign Application Priority Data

Mar. 7, 2016   (JP) ................................. 2016-043876
Aug. 10, 2016  (JP) ................................. 2016-158187

(51) Int. Cl.
  *F16M 11/12*   (2006.01)
  *F16M 11/18*   (2006.01)
  *G03B 17/56*   (2006.01)

(52) U.S. Cl.
  CPC .......... *F16M 11/126* (2013.01); *F16M 11/18* (2013.01); *G03B 17/561* (2013.01)

(58) Field of Classification Search
  CPC .......... F16H 1/163; F16H 1/18; F16H 11/126; F16M 11/126
  See application file for complete search history.

(56) References Cited

U.S. PATENT DOCUMENTS

| | | | | |
|---|---|---|---|---|
| 2010/0122879 A1* | 5/2010 | Louis | ...................... | B60T 7/108 |
| | | | | 188/79.55 |
| 2014/0312155 A1* | 10/2014 | Lucht | ...................... | B60R 22/46 |
| | | | | 242/374 |
| 2015/0219271 A1* | 8/2015 | Kori | ........................ | F16M 11/18 |
| | | | | 74/409 |
| 2017/0159793 A1* | 6/2017 | Schorpp | ................ | F16H 57/021 |
| 2018/0009116 A1* | 1/2018 | Jeong | .................... | B25J 17/0208 |

FOREIGN PATENT DOCUMENTS

| | | |
|---|---|---|
| JP | 2007-170459 | 7/2007 |
| JP | 2017/204763 | * 11/2017 |

* cited by examiner

*Primary Examiner* — Clayton E Laballe
*Assistant Examiner* — Dennis Hancock
(74) *Attorney, Agent, or Firm* — Greenblum & Bernstein, P.L.C.

(57) ABSTRACT

A pan tilt drive device includes a board, a drive worm that is rotatably supported by the board, a terminal worm wheel that is rotatably disposed relative to the board, a holder plate that is parallel to the board, a shaft that is rotatably supported while being parallel to the holder plate, an intermediate worm wheel that is fixed to one end of the shaft, and that meshes with the drive worm, an intermediate worm that is fixed to the other end of the shaft, and that meshes with the terminal worm wheel, a pivot mechanism, and a biasing member that biases the holder plate toward the drive worm and the terminal worm wheel.

8 Claims, 17 Drawing Sheets

PAN TILT DRIVE DEVICE AND CAMERA DEVICE

BACKGROUND

1. Technical Field

The present disclosure relates to a pan tilt drive device and a camera device.

2. Description of the Related Art

Some camera devices are provided with a pan tilt drive device, thereby enabling a camera body to capture an image in a desired direction through pan rotation and tilt rotation. This type of camera device rotates the camera body by using a reduction mechanism to decelerate rotation of a motor. Some camera devices have a preset function to store an imaging direction set by a user so that the camera body automatically faces in the imaging direction. If the camera device provided with the preset function receives a preset instruction, the camera device drives the motor, and transmits rotation of the motor while using the reduction mechanism to decelerate the rotation of a motor. A housing which accommodates the camera body for a camera base performs pan rotation or tilt rotation, or performs both the pan rotation and the tilt rotation so that the camera body is directed toward a desired preset position.

As the related art in which the reduction mechanism is applied to the camera device (for example, a monitoring camera), a reduction gear is known which is provided with a backlash removal function disclosed in Japanese Patent Unexamined Publication No. 2007-170459. The reduction gear provided with the backlash removal function includes a first internal gear which is stationary, a second internal gear which is rotatable, and two planetary pair gears coaxially having a first external gear and a second external gear. The first external gear of the planetary pair gear meshes with the first internal gear, and the second external gear meshes with the second internal gear. A reduction ratio difference is established between a reduction ratio of the first internal gear and the first external gear and a reduction ratio of the second internal gear and the second external gear, and a rotation drive force is input to the reduction gear. If the planetary pair gear revolves while being rotated, the rotation drive force reduced in accordance with the reduction ratio difference is output from the reduction gear. In this case, the second internal gear is directed toward a gear match point between the first internal gear and the second internal gear. Torsional stress is received from both sides, and a backlash is removed.

However, the reduction mechanism transmits the rotation by meshing with a plurality of gears. Consequently, accuracy in a rotation transmission amount may be degraded due to a clearance (backlash) between the gears. In this case, a problem arises in that accurate positioning at the preset position cannot be performed. In a case where the reduction ratio is obtained by a pair of gears meshing with each other, it is relatively easy to restrain the backlash. In this case, the gears mesh with each other on the same plane. Thus, a clearance between tooth surfaces can be reduced by displacing the gears in a direction within a single plane.

However, in a case of a dual stage reduction mechanism in which two gear sets mesh with each other in order to obtain a greater reduction ratio, the gears may mesh with each other on mutually different planes. In this case, since Japanese Patent Unexamined Publication No. 2007-170459 adopts a configuration in which a single stage reduction mechanism reduces the backlash, it is difficult to reduce the clearance between the tooth surfaces by concurrently dis-placing the two gear sets. In view of these circumstances, the camera device provided with the dual stage reduction mechanism is also required to improve position accuracy of a preset operation.

SUMMARY

The present disclosure is made in view of the above-described circumstances, and an object thereof is to provide a pan tilt drive device and a camera device which can improve the position accuracy of the preset operation by reducing a backlash of a pan tilt drive mechanism.

According to the present disclosure, there is provided a pan tilt drive device including a board, a drive worm that is rotatably supported by the board while a rotation center thereof is perpendicular to the board, a terminal worm wheel that is rotatably disposed relative to the board while a rotation center thereof is perpendicular to the board, a holder plate that is parallel to the board, a shaft that is rotatably supported while a rotation center thereof is parallel to the holder plate, an intermediate worm wheel that is fixed to one end of the shaft, and that meshes with the drive worm, an intermediate worm that is fixed to the other end of the shaft, and that meshes with the terminal worm wheel, a pivot mechanism that is disposed across the board and the holder plate, and that supports the holder plate so as to be pivotable around a pivot center perpendicular to the board, and a biasing member that is disposed across the board and the holder plate, and that biases the holder plate in a direction close to the drive worm and the terminal worm wheel.

In addition, according to the present disclosure, there is provided a camera device including the above-described pan tilt drive device as a pan drive device. The camera device includes a pan housing that rotates around a pan rotation center, with respect to a camera base, and a tilt housing that rotates around a tilt rotation center orthogonal to the pan rotation center, with respect to the pan housing. The board is a pan plate fixed to the pan housing, and the terminal worm wheel is a pan worm wheel fixed to the camera base.

DETAILED DESCRIPTION

Hereinafter, an embodiment (hereinafter, referred to as the "present embodiment") which specifically discloses a pan tilt drive device and a camera device according to the present disclosure will be described in detail with proper reference to the drawings. However, in some cases, unnecessarily detailed description may be omitted. For example, in some cases, detailed description for well-known matters or repeated description for substantially the same configuration may be omitted. The reason is to facilitate understanding of those skilled in the art by avoiding the following description from becoming unnecessarily redundant. The accompanying drawings and the following description are provided in order that those skilled in the art sufficiently understand the present disclosure. These are not intended to limit the gist disclosed in claims. An example of the camera device according to the present embodiment described herein, a monitoring camera will be described which is substantially permanently installed in a predetermined place.

Figure 1:
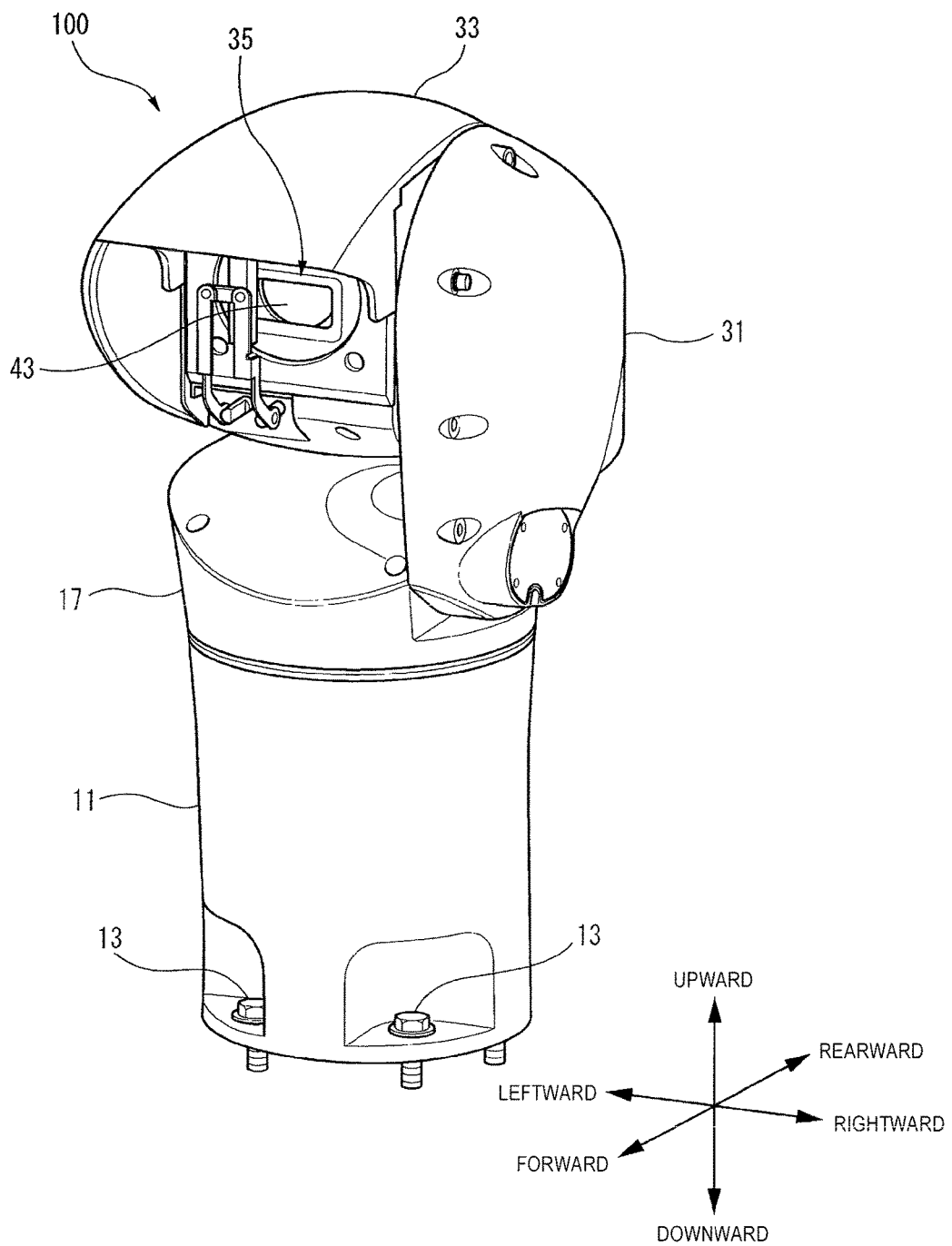
FIG. 1 is a perspective view of a monitoring camera according to the present embodiment.
Figure 2:
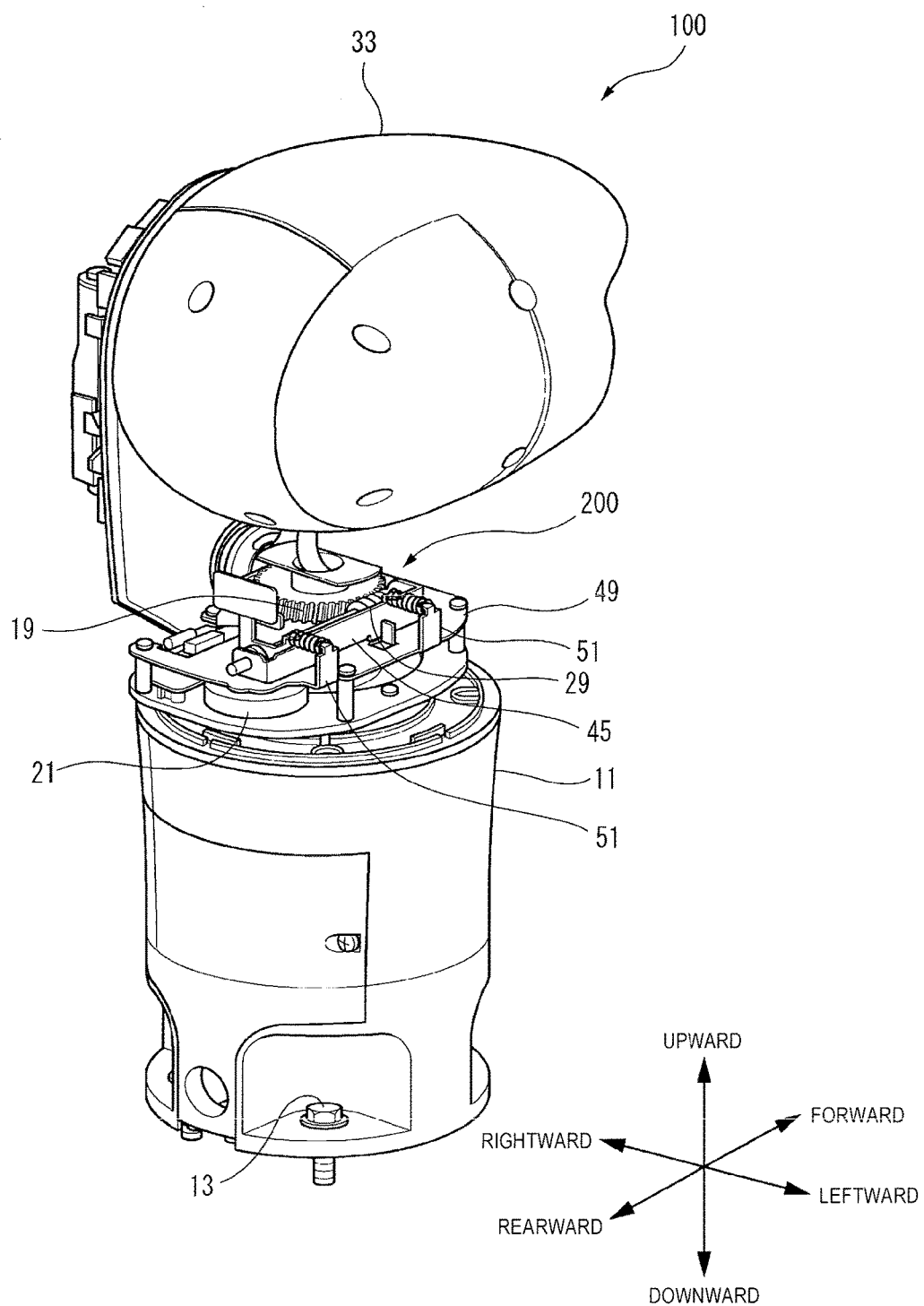
FIG. 2 is a perspective view when the monitoring camera illustrated in FIG. 1 is viewed from a left rear side through a pan drive device.

FIG. 1 is a perspective view of monitoring camera 100 according to the present embodiment. FIG. 2 is a perspective view when monitoring camera 100 illustrated in FIG. 1 is viewed from a left rear side through pan drive device 200. In the present embodiment, upward, downward, forward, rearward, leftward, and rightward directions of monitoring camera 100 respectively follow arrow directions illustrated in FIG. 1.

Monitoring camera 100 according to the present embodiment has a pan tilt drive device. The pan tilt drive device can be configured to function as pan drive device 200. The pan tilt drive device can also be configured to function as tilt drive device 300 (refer to FIG. 4). Monitoring camera 100 according to the present embodiment includes pan drive device 200 functioning as the pan tilt drive device, and tilt drive device 300.

First, a basic configuration of a pan tilt mechanism of monitoring camera 100 will be described.

Monitoring camera 100 has camera base 11. Camera base 11 is formed in a substantially columnar shape. A lower surface of camera base 11 serves as a mounting surface. In monitoring camera 100, the mounting surface of camera base 11 is fixed to a fixing target surface by using fasteners such as bolts 13.

Pan shaft 15 (refer to FIG. 5) is fixed to an upper surface of camera base 11 so as to be coaxial with an axis of camera base 11. Pan shaft 15 protrudes into pan housing 17 so as to rotatably support pan housing 17.

Pan housing 17 is formed in a flat columnar shape (disc shape) having the same radius as that of camera base 11. Pan worm wheel 19 is fixed to an outer periphery of pan shift 15 protruding into pan housing 17. A center of pan shaft 15 serves as pan rotation center Pc (refer to FIG. 5). That is, pan housing 17 is capable of pan rotation around pan rotation center Pc, and is supported by camera base 11.

Figure 3:
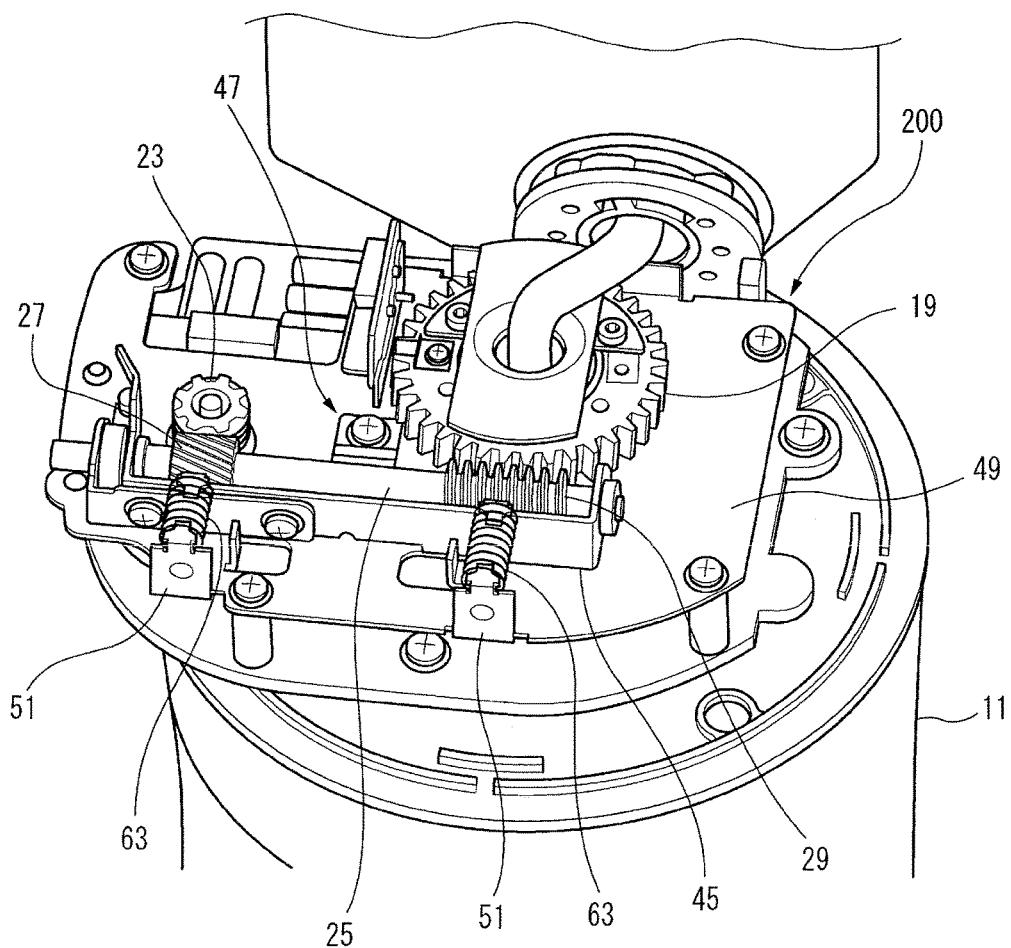
FIG. 3 is a perspective view of a pan drive device.

FIG. 3 is a perspective view of pan drive device 200.

Pan motor 21 whose drive shaft protrudes upward is disposed in pan housing 17. Drive worm 23 is fixed to the drive shaft of pan motor 21. Shaft 25 disposed in a direction orthogonal to pan rotation center Pc between pan motor 21 and pan shaft 15 is rotatably supported by pan housing 17. Intermediate worm wheel 27 meshing with drive worm 23 is fixed to one end of shaft 25 having a substantially cylindrical shape or a cylindrical shape. Intermediate worm 29 meshing with pan worm wheel 19 is fixed to the other end of shaft 25 having a substantially cylindrical shape or a cylindrical shape.

Therefore, if pan motor 21 is driven and drive worm 23 transmit the rotation to intermediate worm wheel 27 of shaft 25, shaft 25 rotates around the center of the housing having a substantially cylindrical shape or a cylindrical shape, as the rotation axis. Since shaft 25 rotates, intermediate worm 29 turns around the outer periphery of pan worm wheel 19 fixed to camera base 11. That is, intermediate worm 29 revolves around pan shaft 15. In this manner, pan housing 17 is driven to perform pan rotation around pan rotation center Pc.

Pan housing 17 is provided with two pairs of worm gears respectively including drive worm 23 and intermediate worm wheel 27, and intermediate worm 29 and pan worm wheel 19, thereby hindering pan housing 17 from being rotated by an external force. That is, a self-locking mechanism is provided, and thus, it is possible to prevent a monitoring direction from being changed since pan housing 17 is rotated by the external force such as wind pressure.

On an upper surface of pan housing 17, pan strut 31 illustrated in FIG. 2 is erected along an upward direction, at a position outside a rotational radius from the center of pan housing 17. Pan strut 31 performs pan rotation integrally with pan housing 17.

Tilt housing 33 is disposed in an erected tip of pan strut 31. Tilt housing 33 has a spherical portion so as to internally accommodate camera body 35. In tilt housing 33, a portion (that is, a right side portion) excluding the above-described spherical portion is cut out. The erected tip of pan strut 31 is disposed in the cutout portion. Tilt shaft 37 (refer to FIG. 10) orthogonal to pan rotation center Pc is fixed to a side portion of tilt housing 33.

Figure 4:
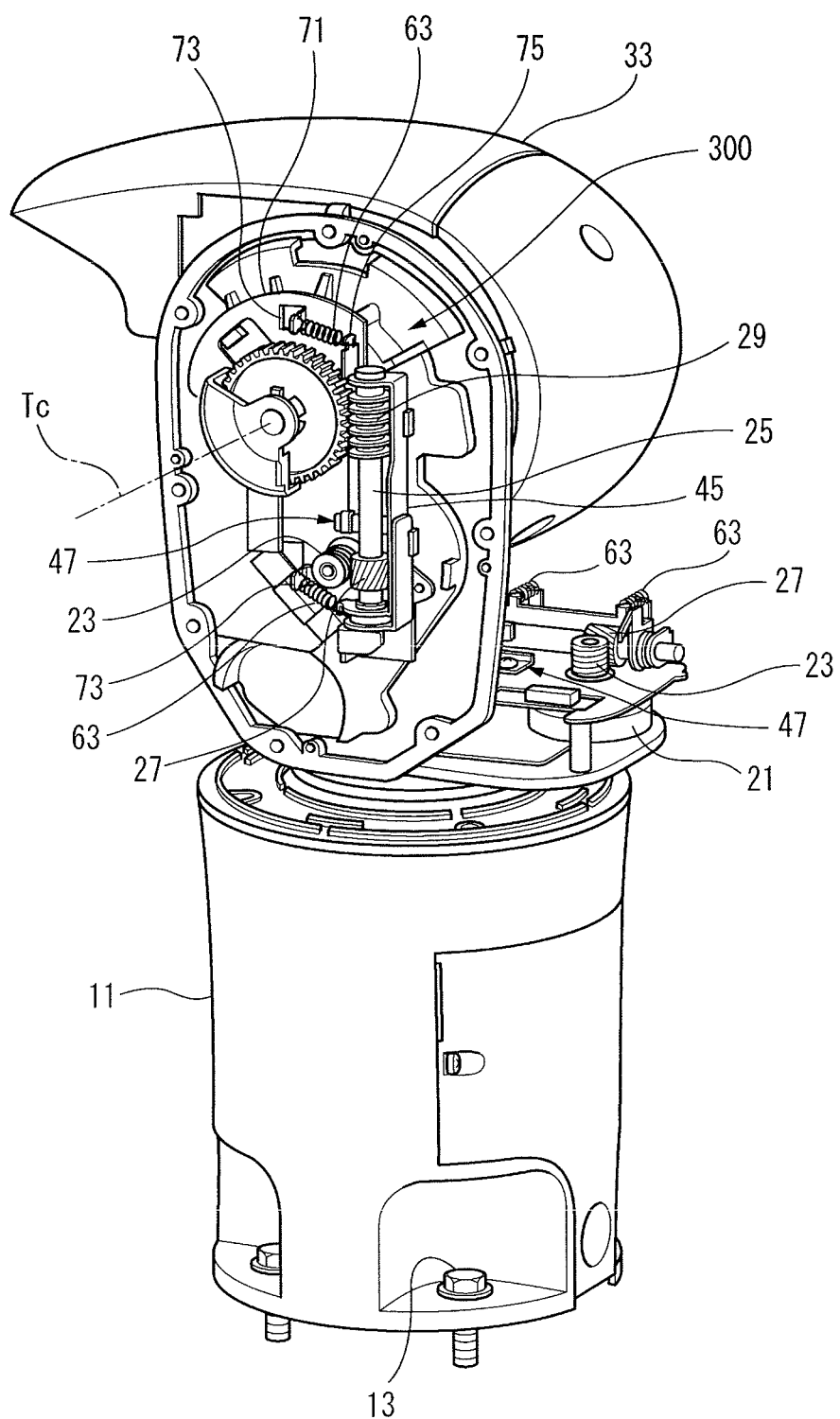
FIG. 4 is a perspective view when the monitoring camera illustrated in FIG. 1 is viewed from a right rear side through a tilt drive device.

FIG. 4 is a perspective view when monitoring camera 100 illustrated in FIG. 1 is viewed from a right rear side through tilt drive device 300.

Tilt shaft 37 protrudes into the erected tip of pan strut 31, and supports tilt housing 33 so as to be rotatable in the erected tip. Tilt worm wheel 39 (refer to FIG. 10) is fixed to the outer periphery of tilt shaft 37 protruding into the erected tip. The center of tilt shaft 37 serves as tilt rotation center Tc. That is, tilt housing 33 is capable of tilt rotation around tilt rotation center Tc, and is supported by the erected tip of pan strut 31.

Tilt motor 41 (refer to FIG. 10) whose drive shaft protrudes in a direction along tilt rotation center Tc is fixed to the erected tip of pan strut 31. Drive worm 23 is fixed to the drive shaft of tilt motor 41. Shaft 25 disposed in a direction orthogonal to tilt rotation center Tc between tilt motor 41 and tilt worm wheel 39 is rotatably supported by the erected tip of pan strut 31. Intermediate worm wheel 27 meshing with drive worm 23 is fixed to one end of shaft 25 having a substantially cylindrical shape or a cylindrical shape. Intermediate worm 29 meshing with tilt worm wheel 39 is fixed to the other end of shaft 25 having a substantially cylindrical shape or a cylindrical shape. Therefore, if tilt motor 41 is driven and drive worm 23 transmit the rotation to intermediate worm wheel 27 of shaft 25, shaft 25 rotates around the center of the housing having a substantially cylindrical shape or a cylindrical shape, as the rotation axis. Since shaft 25 rotates, intermediate worm 29 rotates and drives tilt worm wheel 39. In this manner, tilt housing 33 is driven to perform tilt rotation around tilt rotation center Tc.

Tilt housing 33 is provided with two pairs of worm gears respectively including drive worm 23 and intermediate worm wheel 27, and intermediate worm 29 and tilt worm wheel 39, thereby hindering tilt housing 33 from being rotated by an external force. That is, a self-locking mechanism is provided, and thus, it is possible to prevent a monitoring direction of tilt housing 33 from being changed by the external force such as wind pressure.

For example, as a capture, camera body 35 has an image sensor such as charge coupled devices (CCD) or complementary metal oxide semiconductors (CMOS). Imaging light from lens 43 (refer to FIG. 1) is incident on the capture. Camera body 35 passes through the center of tilt housing 33, and is disposed so that an optical axis of lens 43 disposed integrally with camera body 35 extends along a direction orthogonal to tilt rotation center Tc.

In monitoring camera 100, a portion between camera base 11 and pan housing 17 functions as a pan rotator. A portion between the erected tip of pan strut 31 and tilt housing 33 functions as a tilt rotator. For example, data transmission of imaging information and motor control signals in the pan rotator and the tilt rotator is performed by means of non-contact power line communication (PLC) using an antenna. In monitoring camera 100, power transmission in the pan rotator is performed using a slip ring, for example. Power transmission in the tilt rotator is performed using a twisted line, for example.

In monitoring camera 100, the pan rotator and the tilt rotator have a watertight structure. In the pan rotator and the tilt rotator, a waterproof structure is configured so that a gap between a shaft and a bearing is blocked by a waterproof sealing material which comes into contact with both of these. In this manner, without being covered with a dome cover, monitoring camera 100 can employ outdoor specifications.

Next, the pan tilt drive device will be described.

The pan tilt drive device can be used for both pan drive device 200 and tilt drive device 300. Monitoring camera 100 according to the present embodiment includes both pan drive device 200 and tilt drive device 300. Monitoring camera 100 may include any one of pan drive device 200 and tilt drive device 300.

Pan drive device 200 and tilt drive device 300 have substantially the same configuration. Therefore, hereinafter, pan drive device 200 will be mainly described as a representative example.

The pan tilt drive device has a board, drive worm 23, a terminal worm wheel, holder plate 45, shaft 25, intermediate worm wheel 27, intermediate worm 29, pivot mechanism 47 (refer to FIGS. 7 and 10), and a biasing member.

Figure 5:
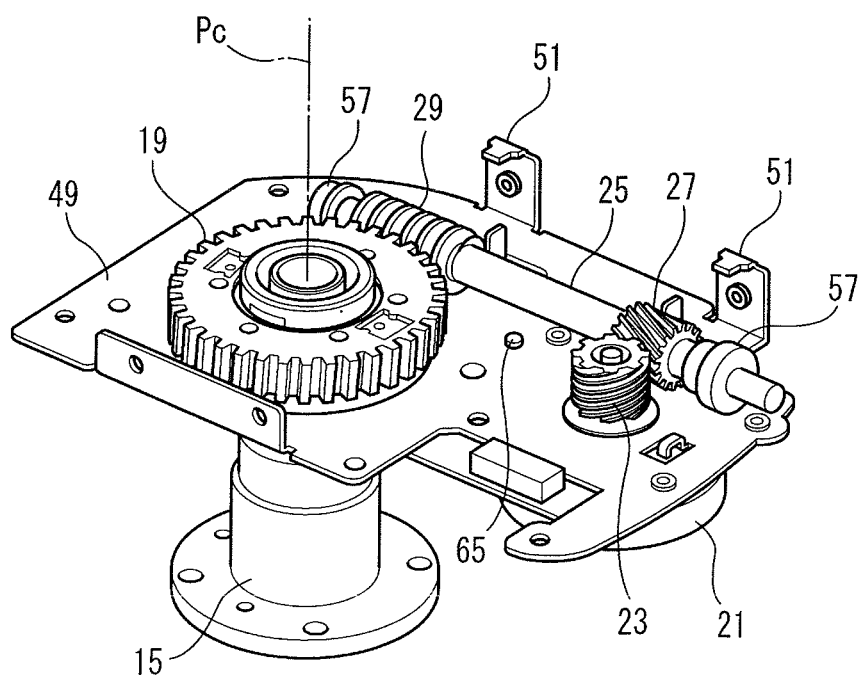
FIG. 5 is a perspective view obtained by omitting some members of the pan drive device.
Figure 6:
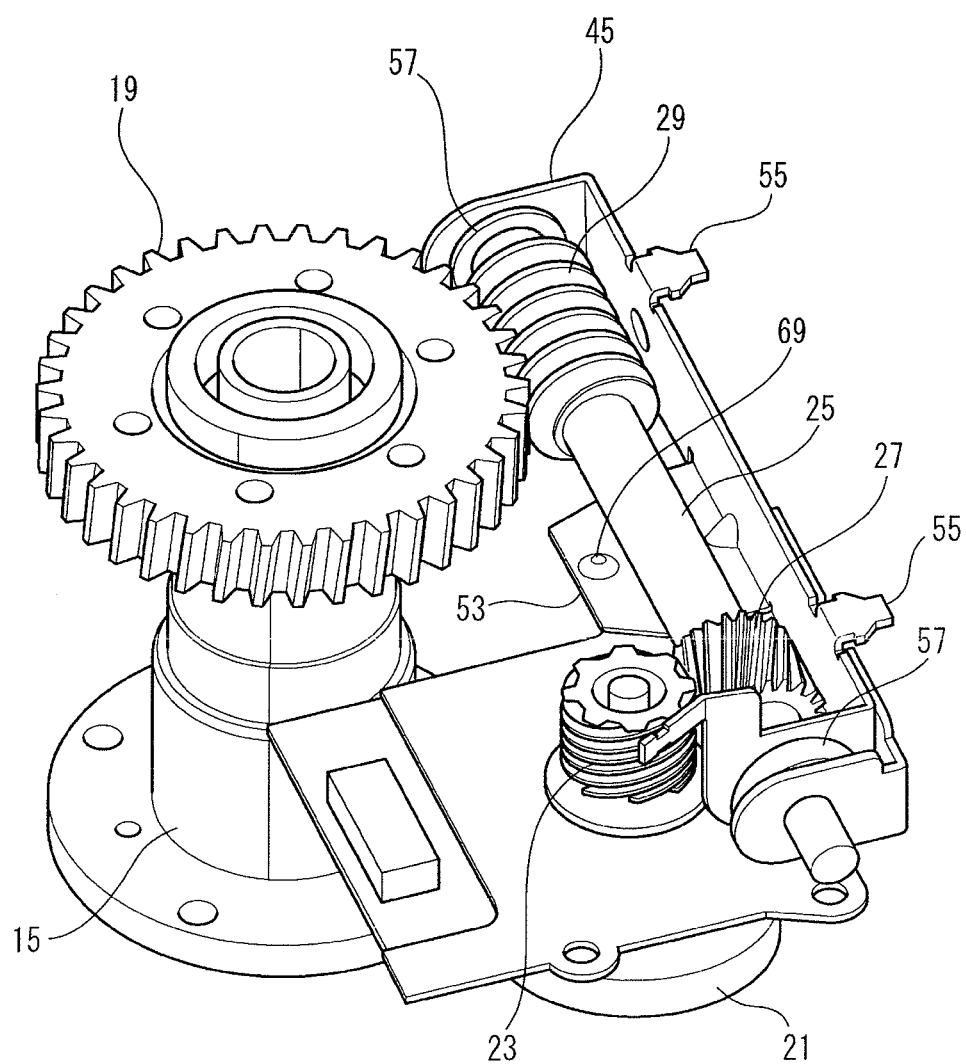
FIG. 6 is a perspective view illustrating a holder plate of the pan drive device.

FIG. 5 is a perspective view obtained by omitting some members of pan drive device 200. FIG. 6 is a perspective view illustrating holder plate 45 of pan drive device 200.

Monitoring camera 100 includes pan drive device 200 as the pan tilt drive device. In pan drive device 200, the board is pan plate 49 fixed to pan housing 17. The terminal worm wheel is pan worm wheel 19 fixed to camera base 11. Pan plate 49 is fixed to pan housing 17. Pan plate 49 is formed on a side opposite to pan worm wheel 19 across shaft 25 in such a way that a pair of separated spring seats 51 are erected in an upward direction.

Drive worm 23 is rotatably supported by pan plate 49 while a rotation center thereof is perpendicular (that is, upward direction) to pan plate 49. Pan motor 21 is fixed to a lower surface of pan plate 49. A drive shaft of pan motor 21 penetrates pan plate 49. Drive worm 23 is fixed to the drive shaft penetrating pan plate 49.

Pan worm wheel 19 is rotatably disposed relative to pan plate 49 while a rotation center thereof is perpendicular to pan plate 49. In this manner, pan plate 49 revolves around pan worm wheel 19.

Holder plate 45 is formed in an elongated shape with a distance longer than a gap between pan worm wheel 19 and drive worm 23. Holder plate 45 is disposed parallel to pan plate 49. Holder plate 45 has a planar portion facing the board. In other words, holder plate 45 has pivot piece 53 (refer to FIG. 6) parallel to pan plate 49. Holder plate 45 has a pair of spring insertion projections 55 protruding to a side opposite to pan worm wheel 19 and drive worm 23 across holder plate 45.

Both ends of shaft 25 are rotatably supported by holder plate 45 while a rotation center thereof is parallel to holder plate 45. For example, both ends of shaft 25 are supported by holder plate 45 via ball bearing 57.

Intermediate worm wheel 27 meshing with drive worm 23 is fixed to one end of shaft 25.

Intermediate worm 29 meshing with pan worm wheel 19 is fixed to the other end of shaft 25.

Figure 7:
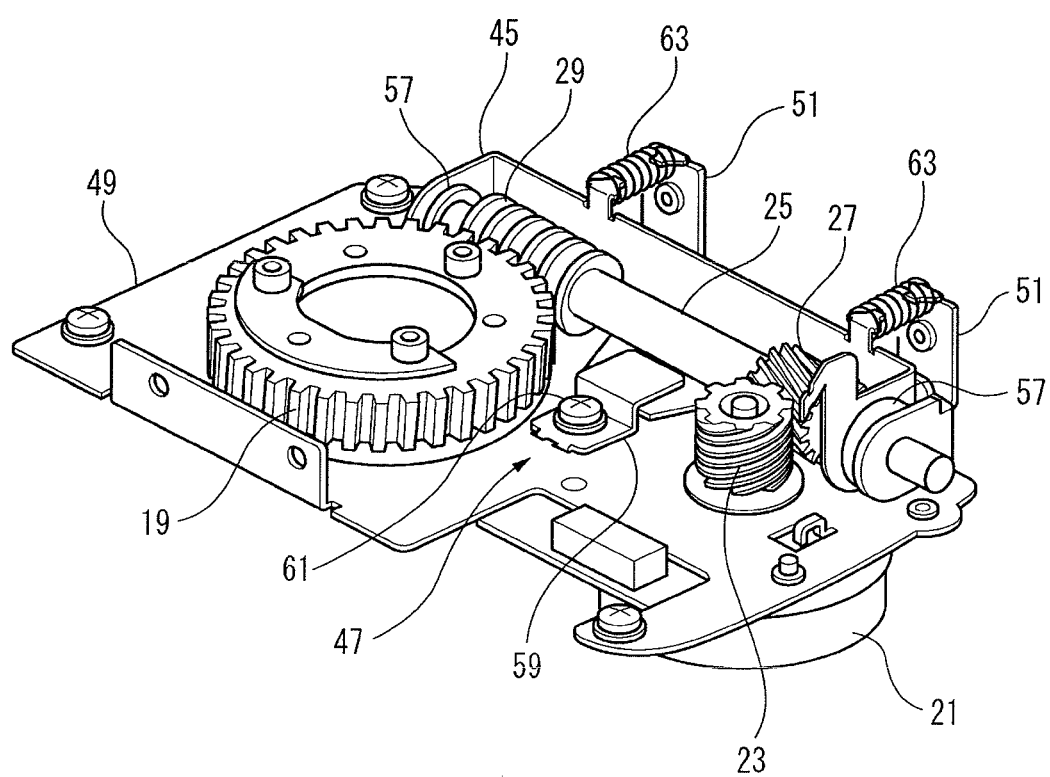
FIG. 7 is a perspective view illustrating an external configuration of a pivot mechanism.
Figure 8:
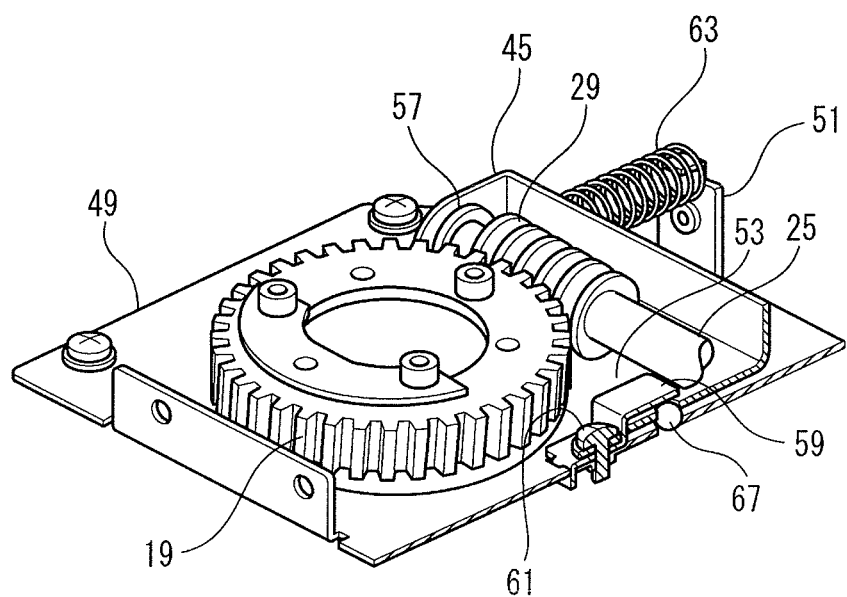
FIG. 8 is a perspective view obtained by cutting out the pivot mechanism illustrated in FIG. 7.

FIG. 7 is a perspective view illustrating an external configuration of pivot mechanism 47. FIG. 8 is a perspective view obtained by cutting out pivot mechanism 47 illustrated in FIG. 7.

Pivot mechanism 47 is disposed across pan plate 49 and holder plate 45. Pivot mechanism 47 supports holder plate 45 so as to be pivotable around pivot center Rc perpendicular to pan plate 49. One end of pivot fixing plate 59 which is bent in a Z-shape is fixed to pan plate 49 by pivot fixing screw 61. The other end of pivot fixing plate 59 presses down pivot piece 53 of holder plate 45.

For example, the biasing member includes coil spring 63. Coil spring 63 is disposed across pan plate 49 and holder plate 45. That is, coil spring 63 is held between spring seat 51 of pan plate 49 and spring insertion projection 55 of holder plate 45. Coil spring 63 functions as a compression spring. Coil spring 63 biases holder plate 45 in a direction close to drive worm 23 and pan worm wheel 19.

Figure 9:
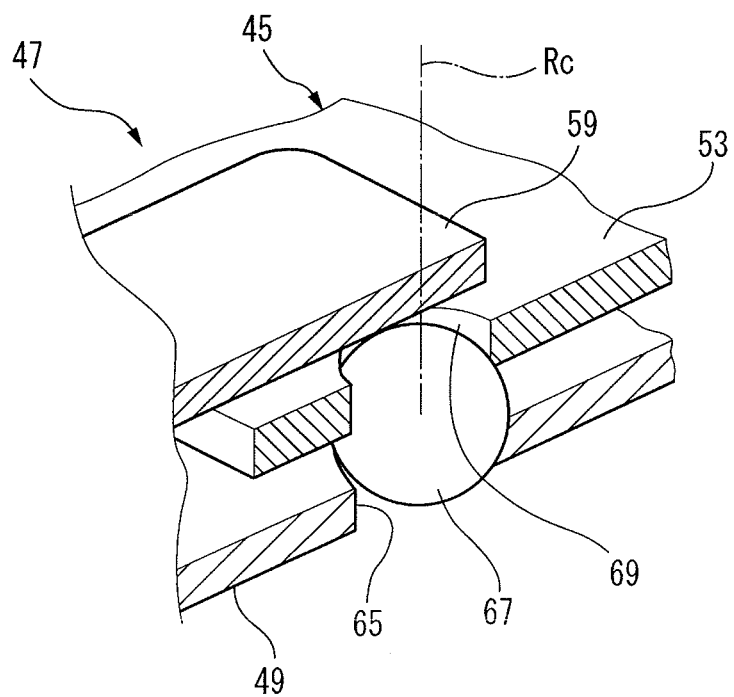
FIG. 9 is an enlarged view of a main portion of the pivot mechanism illustrated in FIG. 8.

FIG. 9 is an enlarged view of a main portion of pivot mechanism 47 illustrated in FIG. 8.

In pan drive device 200, pivot mechanism 47 is configured to include first holding hole 65, spherical body 67, and second holding hole 69. First holding hole 65 is drilled in pan plate 49. A portion of spherical body 67 is fitted into first holding hole 65. Second holding hole 69 is drilled in pivot piece 53 of holder plate 45. The other portion of spherical body 67 is fitted into second holding hole 69, and second holding hole 69 pinches spherical body 67 in cooperation with first holding hole 65.

Figure 10:
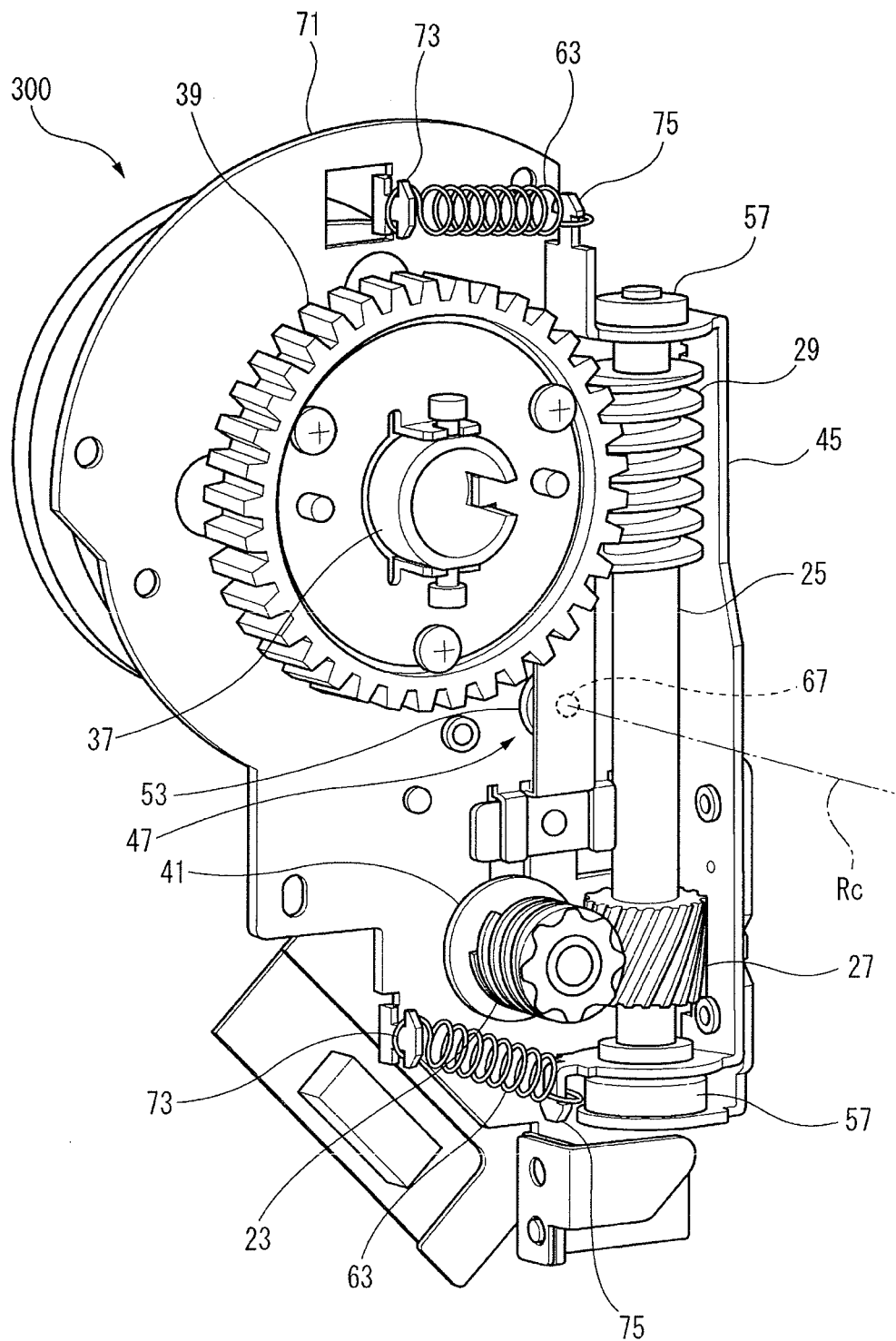
FIG. 10 is an enlarged view of a main portion of the tilt drive device.

FIG. 10 is an enlarged view of a main portion of the tilt drive device.

Monitoring camera 100 includes the pan tilt drive device as tilt drive device 300. In tilt drive device 300, the board is tilt support plate 71 supported by pan strut 31 of pan housing 17. The terminal worm wheel is tilt worm wheel 39 supported by tilt shaft 37 which rotates integrally with tilt housing 33. Tilt support plate 71 is formed in such a way that a pair of separated spring locking projections 73 are erected outward across tilt worm wheel 39 and drive worm 23.

In tilt drive device 300, tilt motor 41 is fixed to tilt support plate 71. A drive shaft of tilt motor 41 penetrates tilt support plate 71. The drive shaft of tilt motor 41 penetrates tilt support plate 71 in the same direction as that of tilt shaft 37. Drive worm 23 is fixed to the drive shaft of tilt motor 41, which penetrates tilt support plate 71.

Holder plate 45 is formed in an elongated shape with a distance longer than a gap between tilt worm wheel 39 and drive worm 23. Holder plate 45 is disposed parallel to tilt support plate 71. Holder plate 45 has pivot piece 53 parallel to tilt support plate 71. Holder plate 45 has a pair of spring locking claws 75 protruding outward (longitudinal direction) across tilt worm wheel 39 and drive worm 23.

Both ends of shaft 25 are rotatably supported by holder plate 45 while a rotation center thereof is parallel to holder plate 45. For example, both ends of shaft 25 are supported by holder plate 45 via ball bearing 57.

Intermediate worm wheel 27 meshing with drive worm 23 is fixed to one end of shaft 25.

Intermediate worm 29 meshing with tilt worm wheel 39 is fixed to the other end of shaft 25.

Pivot mechanism 47 of tilt drive device 300 is disposed across tilt support plate 71 and holder plate 45. Pivot mechanism 47 supports holder plate 45 so as to be pivotable around pivot center Rc perpendicular to tilt support plate 71. In FIG. 10, pivot mechanism 47 of tilt drive device 300 is hidden under shaft 25. In pivot mechanism 47, a first holding hole (not illustrated) is drilled in tilt support plate 71. A second holding hole (not illustrated) is drilled in pivot piece 53. A spherical body is pinched between the first holding hole and the second holding hole. A pivot fixing plate (not illustrated) pinches pivot piece 53 in cooperation with tilt support plate 71. Pivot mechanism 47 is operated similarly to pivot mechanism 47 of pan drive device 200.

In tilt drive device 300, the biasing member includes coil spring 63, for example. Coil spring 63 is disposed across tilt support plate 71 and holder plate 45. That is, coil spring 63 is held between spring locking projection 73 of tilt support plate 71 and spring locking claw 75 of holder plate 45. Coil spring 63 functions as a tension spring. Coil spring 63 biases holder plate 45 in a direction close to drive worm 23 and tilt worm wheel 39.

Next, an operation of the above-described configuration will be described.

In the pan tilt drive device according to the present embodiment, drive worm 23 and pan worm wheel 19 are rotatably disposed in pan plate 49 in a direction in which a rotation center thereof is perpendicular to pan plate 49. Drive worm 23 is fixed to a drive shaft of pan motor 21. Holder plate 45 is disposed parallel to pan plate 49. Holder plate 45 rotatably supports shaft 25 parallel to holder plate 45. Intermediate worm wheel 27 is fixed to one end of shaft 25. Intermediate worm wheel 27 meshes with drive worm 23. Therefore, if pan motor 21 is driven, intermediate worm wheel 27 is rotated by drive worm 23, and shaft 25 is integrally rotated. Intermediate worm 29 is fixed to the other end of shaft 25. Shaft 25 is rotated, thereby integrally rotating intermediate worm 29. Intermediate worm 29 meshes with pan worm wheel 19.

Here, pan worm wheel 19 is rotatably disposed relative to pan plate 49. In a case where pan worm wheel 19 is fixed to pan plate 49 by a separate member, if intermediate worm 29 rotates, intermediate worm 29 is integrated with pan plate 49 having holder plate 45 disposed therein, and revolves around the outer periphery of pan worm wheel 19 (that is, a case of pan drive device 200).

On the other hand, in a case where tilt worm wheel 39 is rotatably fixed to tilt support plate 71, if intermediate worm 29 rotates, tilt worm wheel 39 rotates while being supported by tilt support plate 71 (that is, a case of tilt drive device 300).

These operations lead to a result that the rotation of drive worm 23 is transmitted to pan worm wheel 19 or tilt worm wheel 39 via intermediate worm wheel 27 and intermediate worm 29 which are respectively fixed to both ends of the shaft 25.

Drive worm 23 and intermediate worm wheel 27 configure a first stage reduction mechanism. Intermediate worm 29 and the terminal worm wheel (pan worm wheel 19 or tilt worm wheel 39) configure a second stage reduction mechanism. That is, the pan tilt drive device has the double stage reduction mechanism.

A backlash is present between drive worm 23 and intermediate worm wheel 27. A backlash is also present between intermediate worm 29 and the terminal worm wheel (pan worm wheel 19 or tilt worm wheel 39). The backlash is a clearance between tooth surfaces when a pair of gears mesh with each other. In a case where the backlash is too great, transmission accuracy of a rotation amount is degraded in a rotation transmission mechanism. Consequently, when a camera device is driven in an imaging direction set by a preset function, the camera device cannot be oriented in an accurate direction. The clearance between the tooth surfaces can be restrained by holding the gears after moving the gears so as to be close to each other.

However, in some cases, in the rotation transmission mechanism having the double stage reduction mechanism, it is difficult to concurrently move the gears meshing with each other at two locations so as to be close to each other. For example, in some cases, drive worm 23 and intermediate worm wheel 27 mesh with each other, and intermediate worm 29 and the terminal worm wheel (pan worm wheel 19 or tilt worm wheel 39) mesh with each other. In the rotation transmission mechanism having this multi-stage configuration, a meshing point between drive worm 23 and intermediate worm-wheel 27 and a meshing point between intermediate worm 29 and the terminal worm wheel are located on different planes. Therefore, in order to concurrently press intermediate worm wheel 27 in one end of shaft 25 and intermediate worm 29 in the other end of shaft 25 against the drive worm 23 and the terminal worm wheel, it is necessary to support shaft 25 so as to be displaceable in a three-dimensional direction.

Therefore, according to the present embodiment, in the pan tilt drive device (pan drive device 200 and tilt drive device 300), holder plate 45 for supporting shaft 25 is supported in board (pan plate 49 and tilt support plate 71) by pivot mechanism 47. Shaft 25 is displaceable in the three-dimensional direction by pivot mechanism 47. In this manner, in the pan tilt drive device, intermediate worm wheel 27 in one end of shaft 25 and intermediate worm 29 in the other end of shaft 25 can be concurrently pressed against drive worm 23 and the terminal worm wheel (that is, pan worm wheel 19).

As a result, even according to a configuration in which the pan tilt drive device has the double stage reduction mechanism and the meshing points between the gears are located on different planes, two pairs of gears are held after both of these are concurrently moved close to each other. In this manner, it is possible to restrain degradation in the transmission accuracy of the rotation amount.

In the pan tilt drive device, spherical body 67 is disposed so that a portion of spherical body 67 is fitted into first holding hole 65 formed in the board (pan plate 49 or tilt support plate 71). In spherical body 67, a side opposite to the portion in a radial direction (that is, the other portion) is fitted into second holding hole 69 formed in holder plate 45. Each inner diameter of first holding hole 65 and second holding hole 69 is smaller than a diameter of spherical body 67. Therefore, in a state where holder plate 45 is placed on spherical body 67, holder plate 45 is swingable at 360 degrees in any desired direction. That is, holder plate 45 is pivotable around pivot center Rc perpendicular to the board passing through the center of spherical body 67. This pivoting enables both operations of the rotation around pivot center Rc and the swinging around spherical body 67 as a fulcrum. In this manner, pivot mechanism 47 employs a simple structure in which shaft 25 is displaceable in the three-dimensional direction so that intermediate worm wheel 27 in one end of shaft 25 and intermediate worm 29 in the other end of shaft 25 can be concurrently pressed against drive worm 23 and the terminal worm wheel. Accordingly, pivot mechanism 47 can support holder plate 45.

Then, in monitoring camera 100 according to the present embodiment, intermediate worm wheel 27 is fixed to camera base 11. Pan housing 17 is supported by camera base 11 so as to be rotatable around pan rotation center Pc. If the motor is driven, shaft 25 is rotated by drive worm 23. Intermediate worm 29 fixed to the other end of shaft 25 is rotated integrally with shaft 25. Intermediate worm 29 meshes with intermediate worm wheel 27. Therefore, intermediate worm 29 is integrated with pan plate 49 having holder plate 45 disposed therein, and revolves around the outer periphery of intermediate worm wheel 27. In this manner, pan housing 17 together with pan plate 49 is rotated with respect to camera base 11. At this time, shaft 25 is pressed against drive worm 23 and intermediate worm wheel 27 by pivot mechanism 47. As a result, in monitoring camera 100, degradation in the transmission accuracy of the pan rotation amount is restrained in the double stage reduction mechanism in which the rotation is transmitted from drive worm 23 to intermediate worm wheel 27. That is, in monitoring camera 100, the rotation of drive worm 23 is very accurately transmitted to intermediate worm wheel 27 while being decelerated at a great reduction ratio by the pan drive device.

In monitoring camera 100, tilt shaft 37 is fixed to tilt housing 33. Tilt support plate 71 is supported by pan housing 17. Tilt support plate 71 supports tilt shaft 37 so as to be rotatable around tilt rotation center Tc. If the motor is driven, shaft 25 is rotated by drive worm 23. Intermediate worm 29 fixed to the other end of shaft 25 is rotated integrally with shaft 25. Intermediate worm 29 meshes with tilt worm wheel 39. Therefore, tilt housing 33 is rotated integrally with tilt shaft 37 fixed to tilt worm wheel 39. In this manner, tilt housing 33 is rotated with respect to tilt support plate 71. At this time, shaft 25 is pressed against drive worm 23 and tilt worm wheel 39 by pivot mechanism 47. As a result, in monitoring camera 100, degradation in the transmission accuracy of the tilt rotation amount is restrained in the double stage reduction mechanism in which the rotation is transmitted from drive worm 23 to tilt worm wheel 39. That is, in monitoring camera 100, the rotation of drive worm 23 is very accurately transmitted to tilt worm wheel 39 while being decelerated at a great reduction ratio by the tilt drive device.

In monitoring camera 100, degradation in the transmission accuracy of the pan rotation amount and degradation in the transmission accuracy of the tilt rotation amount are restrained by both the pan drive device and the tilt drive device restrain. That is, in monitoring camera 100, in each of the pan drive device and the tilt drive device, the rotation of drive worm 23 is very accurately transmitted to pan worm wheel 19 and tilt worm wheel 39 while being decelerated at a great reduction ratio.

Next, Modification Example 1 according to the present embodiment (hereinafter, referred to as "Modification Example 1") will be described.

A pan tilt drive device according to Modification Example 1 has pan drive device 200A and tilt drive device 300A.

Figure 11:
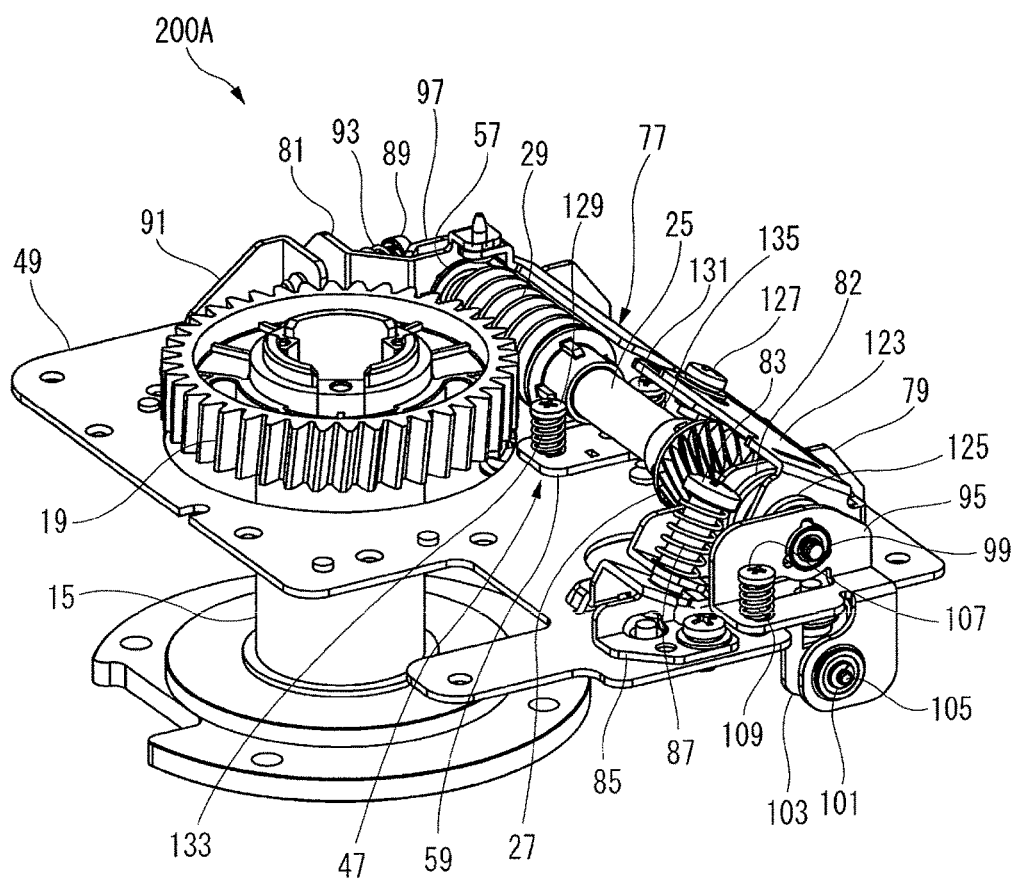
FIG. 11 is a perspective view when a pan drive device according to Modification Example 1 is viewed from an intermediate worm wheel side.

FIG. 11 is a perspective view when pan drive device 200A according to Modification Example 1 is viewed from intermediate worm wheel 27 side. In Modification Example 1, the same reference numerals will be given to members which are the same as the members illustrated in FIGS. 1 to 10, and repeated description will be omitted. Pan drive device 200A has holder plate 77. In pan drive device 200A, holder plate 77 has a shape different from that of holder plate 45 illustrated in FIG. 6. Therefore, a new reference numeral is given to holder plate 77.

Holder plate 77 has a pair of holder side plate 79 and holder side plate 81 which support both ends of shaft 25. One end of one holder side plate 79 rotatably supports an axial end side from intermediate worm wheel 27 of shaft 25 via collar 82 fixed to an outer ring of ball bearing 57. Preload screw 83 rotatably penetrates the other end of holder side plate 79. Preload screw 83 meshes with bracket 85 fixed to pan plate 49. Preload spring 87 serving as a biasing member is externally inserted between a head and holder side plate 79 in preload screw 83. Preload spring 87 biases holder side plate 79 in a direction toward pan worm wheel 19.

One end of other holder side plate 81 rotatably supports an axial end side from intermediate worm 29 of shaft 25 via ball bearing 57. Preload screw 89 rotatably penetrates the other end of holder side plate 81. Preload screw 89 meshes with bracket 91 fixed to pan plate 49. Preload spring 93 serving as a biasing member is externally inserted between a head and holder side plate 81 in preload screw 89. Preload spring 93 biases holder side plate 81 in a direction toward pan worm wheel 19.

In this way, in pan drive device 200A, the biasing member (preload spring 87 and preload spring 93) biases a pair of holder side plate 79 and holder side plate 81 in a swing direction in which intermediate worm 29 is moved close to the terminal worm wheel (pan worm wheel 19).

In pan drive device 200A, both ends of the shaft on the outer side from the holder side plate are supported by a pair of hinge plate 95 and hinge plate 97. One end of one hinge plate 95 rotatably supports an axial end of shaft 25 via ball bearing 99. An outer ring of ball bearing 101 is fixed to the other end of hinge plate 95. Spindle 105 fixed to cutting and raising piece 103 formed in pan plate 49 is fixed to an inner ring of ball bearing 99. Therefore, hinge plate 95 is supported so as to be swingable to pan plate 49 by spindle 105 disposed in the same direction as shaft 25.

Offset screw 107 rotatable penetrates the other end of hinge plate 95. Offset screw 107 meshes with pan plate 49. Offset spring 109 is externally inserted between a head and hinge plate 95 in offset screw 107. Offset spring 109 prevents rattling by biasing hinge plate 95 in the direction toward pan worm wheel 19.

Figure 12:
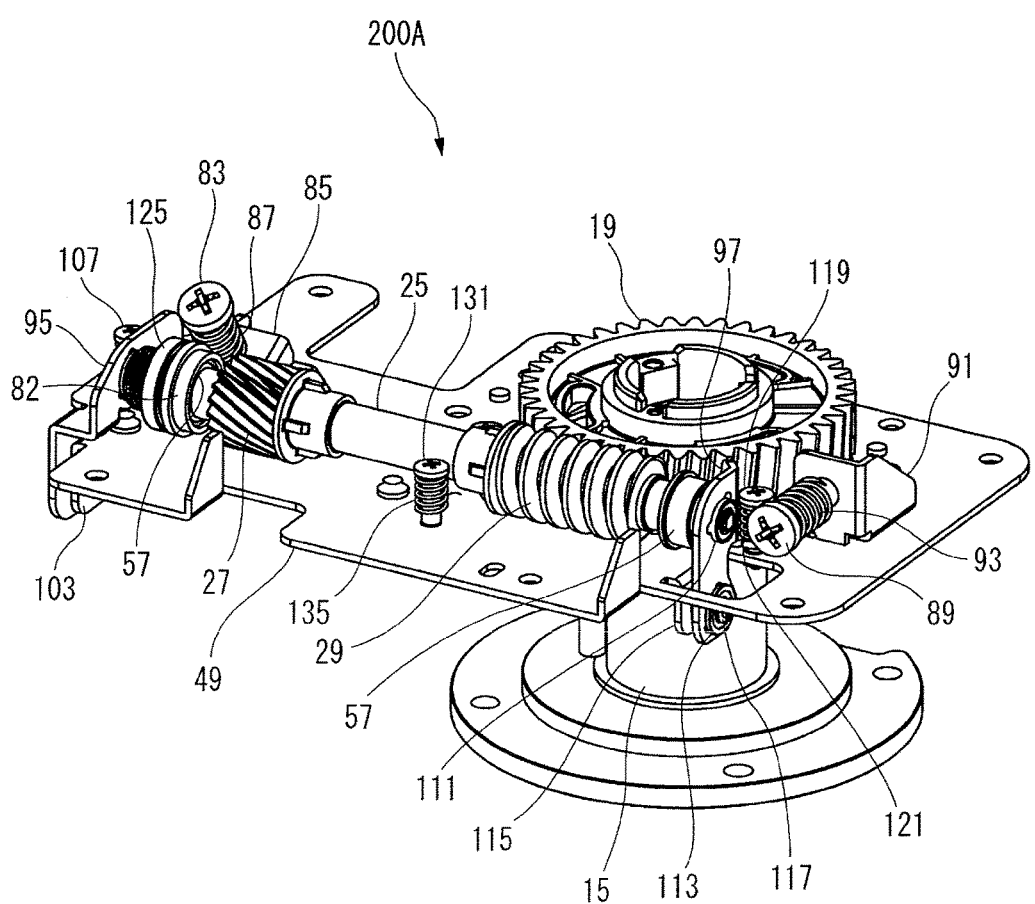
FIG. 12 is a perspective view when the pan drive device according to Modification Example 1 is viewed from an intermediate worm side.

FIG. 12 is a perspective view when pan drive device 200A according to Modification Example 1 is viewed from intermediate worm 29 side. One end of other hinge plate 97 rotatably supports an axial end of shaft 25 via ball bearing 111. A outer ring of ball bearing 113 is fixed to the other end of hinge plate 97. Spindle 117 fixed to cutting and raising piece 115 formed in pan plate 49 is fixed to an inner ring of ball bearing 113. Therefore, hinge plate 97 is supported so as to be swingable to pan plate 49 by spindle 117 disposed in the same direction as shaft 25.

Offset screw 119 rotatable penetrates the other end of hinge plate 97. Offset screw 119 meshes with pan plate 49. Offset spring 121 is externally inserted between a head and hinge plate 97 in offset screw 119. Offset spring 109 prevents rattling by biasing hinge plate 97 in the direction toward pan worm wheel 19.

In holder plate 77, pan drive device 200A has reinforcement plate 123 illustrated in FIG. 11. Reinforcement plate 123 is formed of a sheet metal material, as a separate body from holder plate 77. Reinforcement plate 123 extends along shaft 25 outside intermediate worm wheel 27. One end in the longitudinal direction of reinforcement plate 123 is folded perpendicular to shaft 25, and is rotatably supported by shaft 25 via collar 125 supported by the outer ring of ball bearing 57. The other end in the longitudinal direction of reinforcement plate 123 is screwed to holder plate 77 by reinforcement plate fixing screw 127. Reinforcement plate 123 may also be fixed to a side wall in addition to an upper wall of holder plate 77. In this case, reinforcement plate 123 can be formed using a single component which is concurrently fixed to the upper wall and the side wall.

In pan drive device 200A, drive force from pan motor 21 is first transmitted to intermediate worm wheel 27 of shaft 25. Therefore, if the rigidity of holder plate 77 in the vicinity of intermediate worm wheel 27 is insufficiently, intermediate worm wheel 27 is separated from drive worm 23, thereby causing the rattling. Pan drive device 200A adopts a structure in which reinforcement plate 123 is fixed to holder plate 77 and reinforcement plate 123 also supports shaft 25. Accordingly, the rigidity of holder plate 77 in the vicinity of intermediate worm wheel 27 is remarkably improved, compared to that of other portions.

Pan drive device 200A includes pivot mechanism 47. In pivot mechanism 47 of pan drive device 200A, a pair of offset screw 129 and offset screw 131 penetrate pivot fixing plate 59. Offset spring 133 and offset spring 135 are externally inserted between a head and pivot fixing plate 59 in offset screw 129 and offset screw 131. Offset spring 133 and offset spring 135 prevent rattling by biasing pivot fixing plate 59, pivot piece 53, and spherical body 67 (refer to FIG. 9) toward pan plate 49 side.

Figure 13:
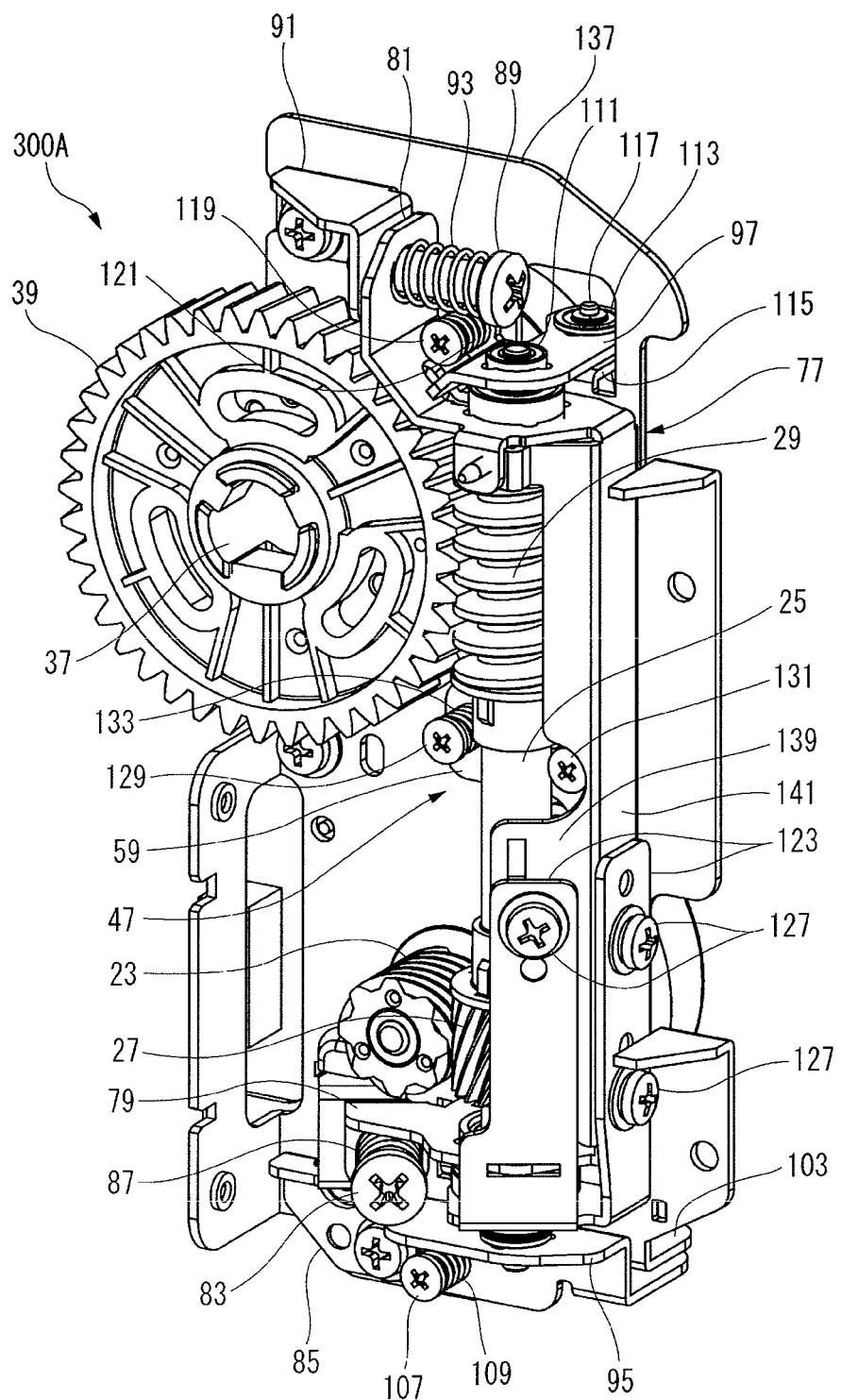
FIG. 13 is an enlarged view of a main portion of a tilt drive device according to Modification Example 1.

FIG. 13 is an enlarged view of a main portion of tilt drive device 300A according to Modification Example 1. Monitoring camera 100 can include a pan tilt drive device as tilt drive device 300A. In tilt drive device 300A, the board is tilt support plate 137 supported by pan strut 31 of pan housing 17. The terminal worm wheel is tilt worm wheel 39 supported by tilt shaft 37 which rotates integrally with tilt housing 33. In tilt drive device 300A, tilt support plate 137 has a shape different from that of tilt support plate 71 illustrated in FIG. 10. Thus, a new reference numeral is given to tilt support plate 137.

Figure 14:
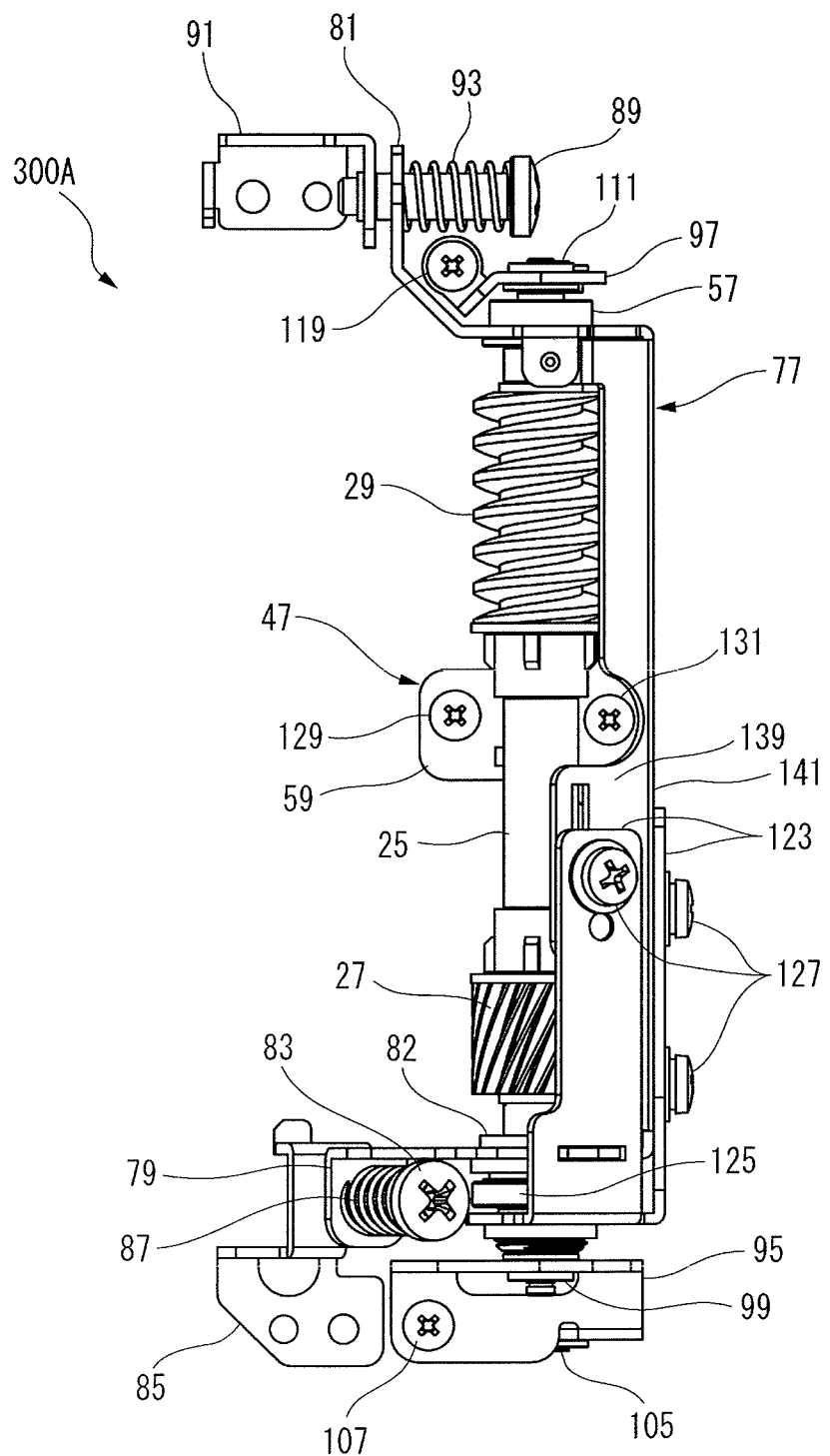
FIG. 14 is a view for describing a main portion obtained by omitting some members of the tilt drive device illustrated in FIG. 13.

Main members of tilt drive device 300A are the same as those of pan drive device 200A. Each function of the main members is the same as that in a case of pan drive device 200A. Therefore, in tilt drive device 300A, only the common member names will be described, and are illustrated in FIGS. 13 and 14. Repeated description will be omitted.

FIG. 14 is a view for describing a main portion obtained by omitting some members of tilt drive device 300A illustrated in FIG. 13.

As illustrated in FIGS. 13 and 14, tilt drive device 300A includes pivot mechanism 47, pivot fixing plate 59, holder side plate 79, holder side plate 81, collar 82, preload screw 83, bracket 85, preload spring 87, preload screw 89, bracket 91, preload spring 93, hinge plate 95, hinge plate 97, ball bearing 99, ball bearing 101, cutting and raising piece 103, spindle 105, offset screw 107, offset spring 109, ball bearing 111, ball bearing 113, cutting and raising piece 115, spindle 117, offset screw 119, offset spring 121, reinforcement plate 123, collar 125, reinforcement plate fixing screw 127, offset screw 129, offset screw 131, offset spring 133, and offset spring 135.

As described above, reinforcement plate 123 is also fixed to side wall 141 in addition to upper wall 139 of holder plate 77. Reinforcement plate 123 is formed using a single component which is concurrently fixed to upper wall 139 and side wall 141.

Next, an operation of the configuration according to Modification Example 1 will be described.

In pan tilt drive device (pan drive device 200A and tilt drive device 300A) according to Modification Example 1, holder plate 77 has a pair of holder side plate 79 and holder side plate 81 which support both ends of shaft 25. Holder side plate 79 and holder side plate 81 respectively cause preload spring 87 and preload spring 93 which serve as the biasing member to bias intermediate worm 29 in the swing direction close to the terminal worm wheel.

According to the pan tilt drive device, the clearance between the tooth surfaces can be restrained in such a way that preload spring 87 and preload spring 93 hold the gears by moving the gears so as to be close to each other.

In pan tilt drive device (pan drive device 200A and tilt drive device 300A), holder plate 77 for supporting shaft 25 is supported in the board (pan plate 49 and tilt support plate 137) by pivot mechanism 47. Shaft 25 is displaceable in the three-dimensional direction by pivot mechanism 47. In this manner, in the pan tilt drive device, intermediate worm wheel 27 in one end of shaft 25 and intermediate worm 29 in the other end of shaft 25 can be concurrently pressed against drive worm 23 and the terminal worm wheel (that is, pan worm wheel 19 and tilt worm wheel 39).

As a result, even according to a configuration in which the pan tilt drive device has the double stage reduction mechanism and the meshing points between the gears are located on different planes, two pairs of gears are held after both of these are concurrently moved close to each other. In this manner, it is possible to restrain degradation in the transmission accuracy of the rotation amount.

In the pan tilt drive device, both ends of shaft 25 are supported by a pair of hinge plate 95 and hinge plate 97. A pair of hinge plate 95 and hinge plate 97 are respectively supported so as to be swingable to pan plate 49 by spindle 105 and spindle 117 which are disposed in the same direction as shaft 25. Therefore, shaft 25 are supported so as to be swingable around spindle 105 and spindle 117. Shaft 25 is also biased in the swing direction close to the terminal worm wheel by a component force of preload spring 87 and preload spring 93. A main biasing force in this swing direction is applied by offset spring 109 and offset spring 121.

Both ends of shaft 25 are respectively supported by a pair of hinge plate 95 and hinge plate 97, and hinge plate 95 and hinge plate 97 are respectively supported in pan plate 49 by spindle 105 and spindle 117, thereby restricting separation from pan plate 49 in the vertical direction. In this manner, when a strong external force acts on a gear row, the pan tilt drive device rigidly prevents shaft 25 from being largely separated from pan plate 49 in the vertical direction.

In the pan tilt drive device (pan drive device 200A and tilt drive device 300A) according to Modification Example 1, holder plate 77 has reinforcement plate 123. Holder side plate 81 extends along shaft 25 outside intermediate worm wheel 27, and supports shaft 25.

Therefore, according to the pan tilt drive device, a structure is adopted in which reinforcement plate 123 is fixed to holder plate 77 and reinforcement plate 123 also supports shaft 25. Accordingly, the rigidity of holder plate 77 in the vicinity of intermediate worm wheel 27 can be remarkably improved, compared to that of other portions. As a result, it is possible to restrain rattling caused by intermediate worm wheel 27 separated from drive worm 23.

Next, Modification Example 2 according to the present embodiment (hereinafter, referred to as "Modification Example 2") will be described.

The pan tilt drive device according to Modification Example 2 has pan drive device 200B and tilt drive device 300B. In Modification Example 2, the same reference numerals will be given to members which are the same as the members illustrated in FIGS. 11 to 14, and repeated description will be omitted.

Figure 15:
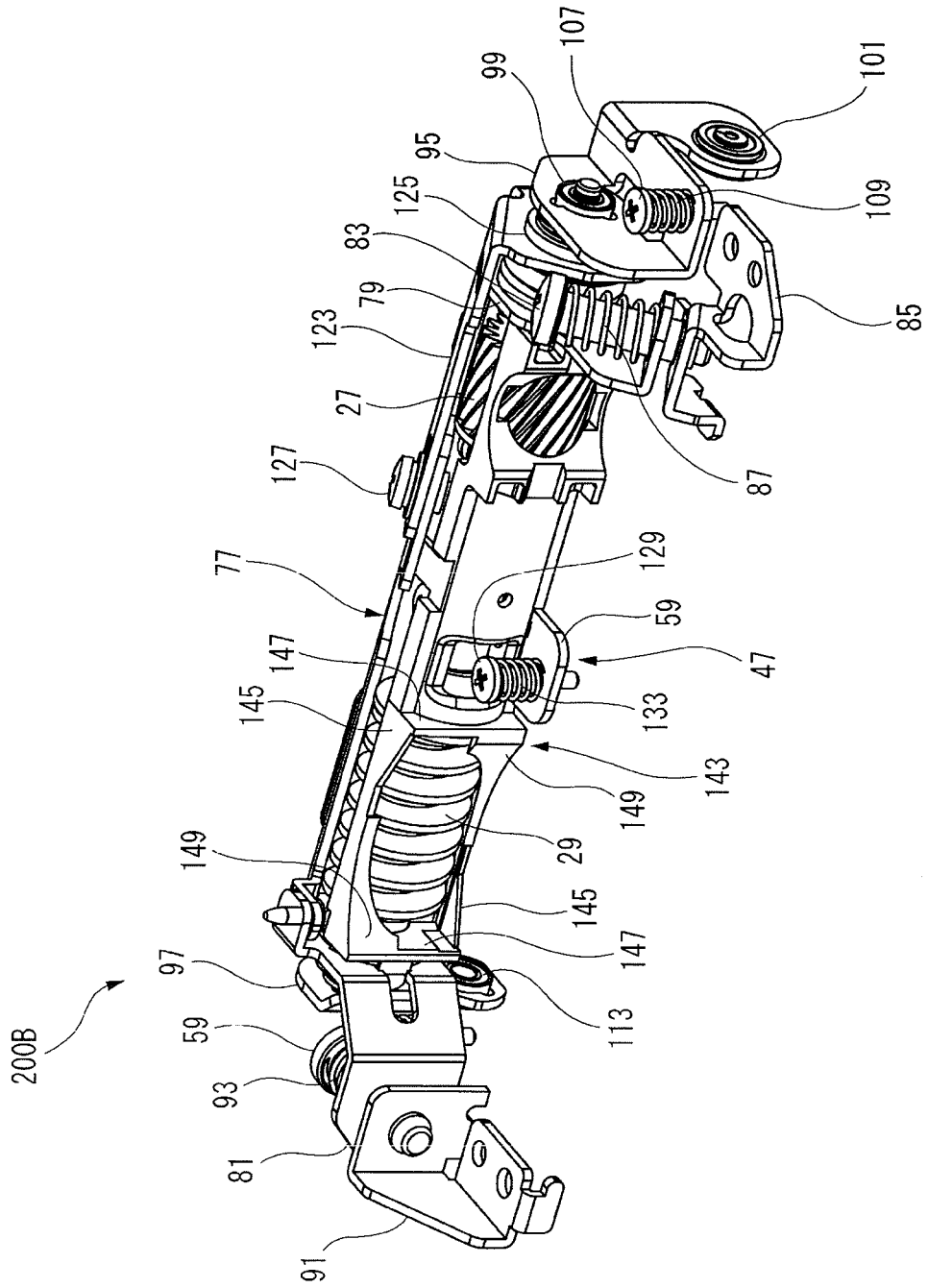
FIG. 15 is a view for describing a main portion obtained by omitting some members of a tilt drive device according to Modification Example 2.

FIG. 15 is a view for describing a main portion obtained by omitting some members of pan drive device 200B according to Modification Example 2.

In pan drive device 200B, flowing direction regulator 143 is disposed in holder plate 77. Flowing direction regulator 143 is formed integrally with holder plate 77, but a separate body may be attached to holder plate 77. Holder plate 77 has a pair of leakage preventing side plates 145 which are parallel to each other.

A pair of leakage preventing side plates 145 are disposed across intermediate worm 29 in a direction in which the terminal worm wheel (pan worm wheel 19) is pinched in a thickness direction (direction parallel to pan plate 49). An edge on pan worm wheel 19 side of leakage preventing side plate 145 is formed in an arc shape along an outer peripheral circle of pan worm wheel 19.

In a pair of leakage preventing side plates 145, both ends in a direction extending along shaft 25 are respectively connected by connection plate 147. A pair of leakage preventing side plates 145 connected by connection plate 147 have a rectangular box shape in a front view from pan worm wheel 19. A pair of triangular grease loading pieces 149 are formed across the connection plate 147 and leakage preventing side plate 145 in a pair of rectangular box-shaped diagonal corners. Grease loading pieces 149 is formed along the edge of leakage preventing side plate 145 so as to be curved along the outer peripheral circle of pan worm wheel 19. Therefore, flowing direction regulator 143 is configured to include a pair of leakage preventing side plates 145, a pair of connection plates 147, and a pair of grease loading pieces 149.

In flowing direction regulator 143, intermediate worm 29 is disposed between a pair of grease loading pieces 149. Pan worm wheel 19 meshes with intermediate worm 29 exposed between a pair of grease loading pieces 149.

Flowing direction regulator 143 disposed in holder plate 77 is disposed in the vicinity of the meshing portion between intermediate worm 29 and pan worm wheel 19. Flowing direction regulator 143 functions to guide grease extruded from the meshing portion to a tooth portion of pan worm wheel 19. The grease guided to pan worm wheel 19 is delivered to the tooth portion by the rotation of pan worm wheel 19, and returns mainly to grease loading pieces 149 of flowing direction regulator 143.

Monitoring camera 100 can include the pan tilt drive device as tilt drive device 300B. In tilt drive device 300B, the board is tilt support plate 137 supported by pan strut 31 of pan housing 17. The terminal worm wheel is tilt worm wheel 39 supported by tilt shaft 37 which rotates integrally with tilt housing 33.

Figure 16:
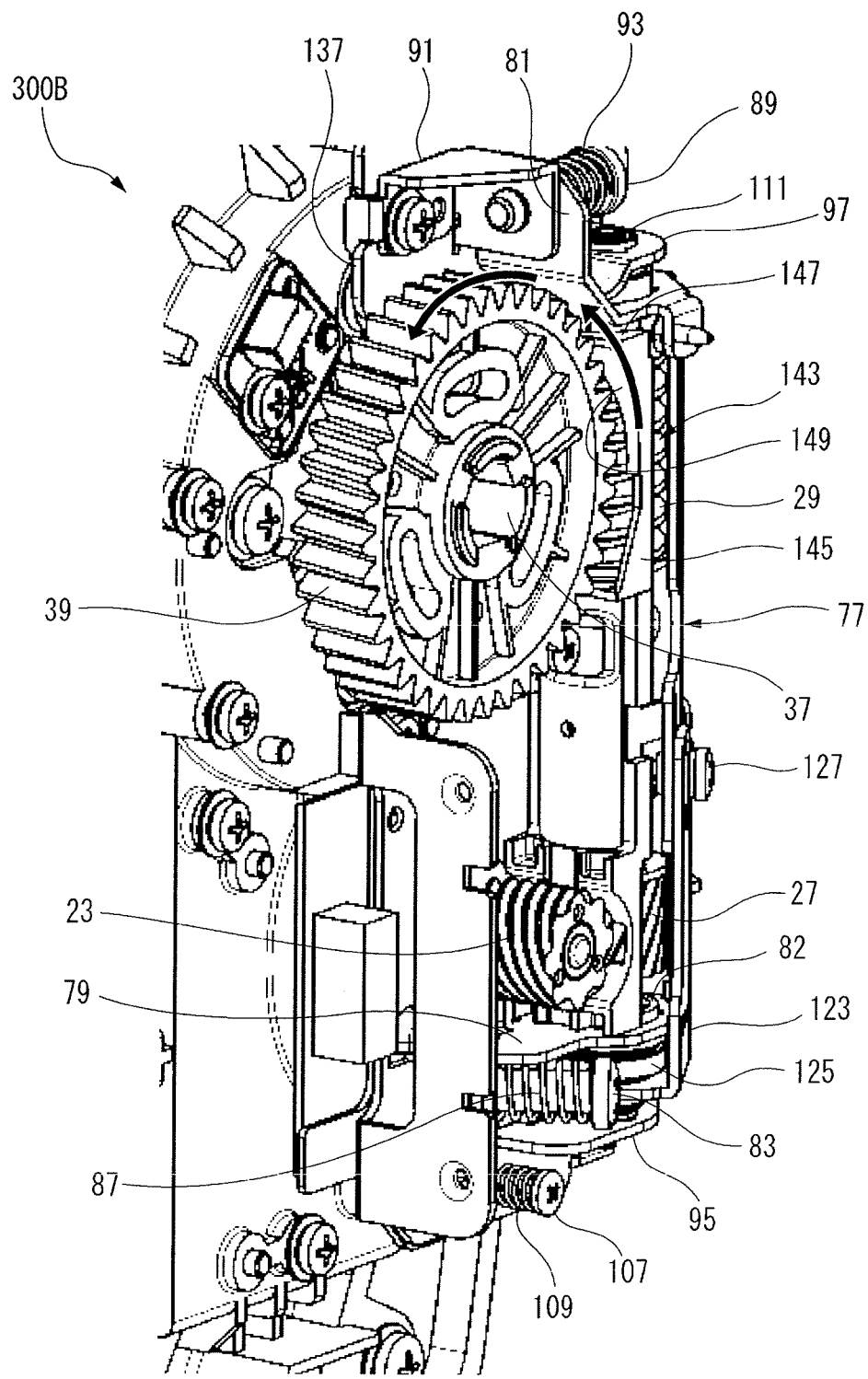
FIG. 16 is an enlarged view of a main portion of the tilt drive device according to Modification Example 2.
Figure 17:
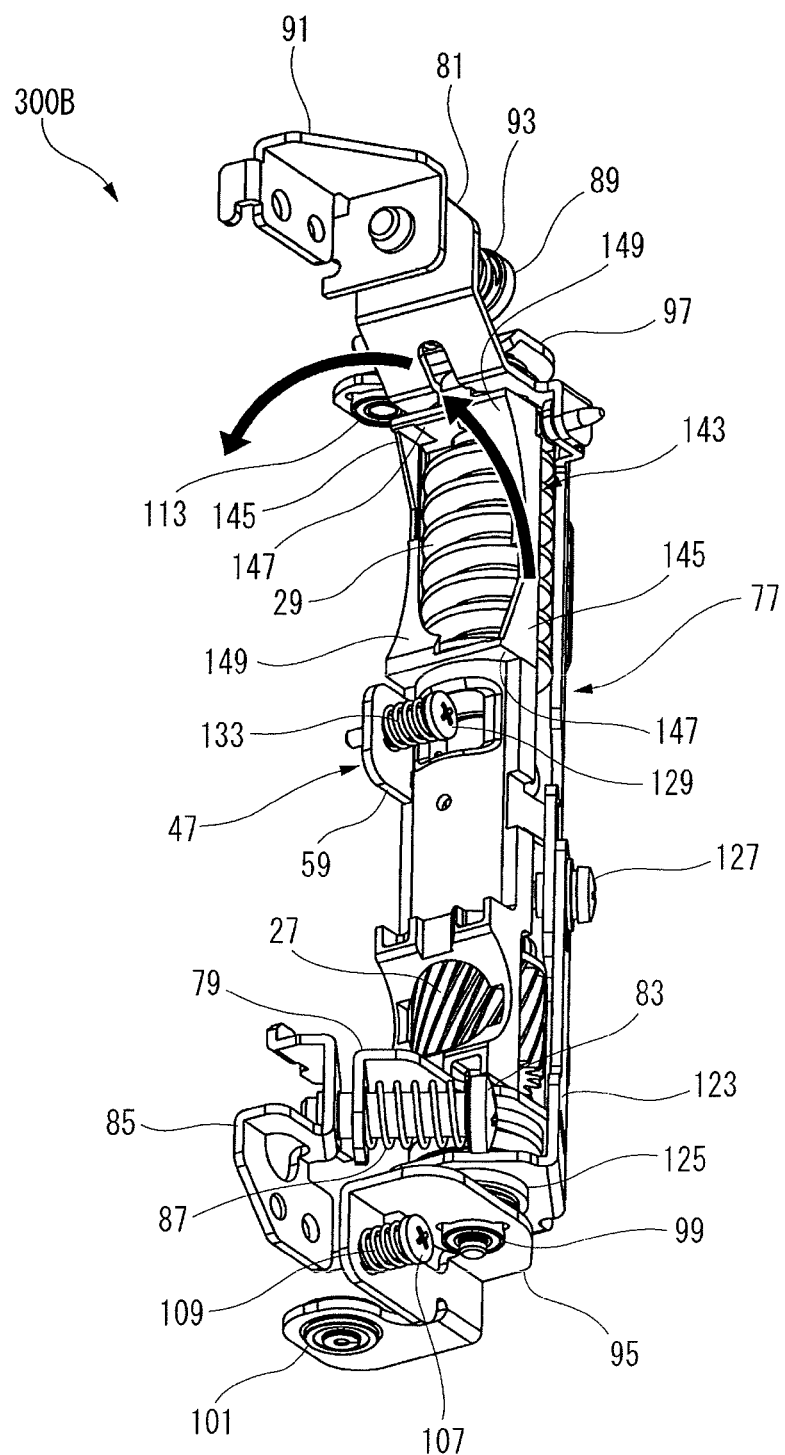
FIG. 17 is a view for describing a main portion, which illustrates a grease flow in the tilt drive device illustrated in FIG. 16.

Main members of tilt drive device 300B are the same as those of pan drive device 200B. Each function of the main members is the same as that in a case of pan drive device 200B. Therefore, in tilt drive device 300B, only the common member, names will be described, and are illustrated in FIGS. 16 and 17. Repeated description will be omitted.

FIG. 16 is an enlarged view of a main portion of tilt drive device 300B according to Modification Example 2. FIG. 17 is a view for describing a main portion, which illustrates a grease flow in tilt drive device 300B illustrated in FIG. 16.

As illustrated in FIGS. 16 and 17, tilt drive device 300B includes flowing direction regulator 143. Flowing direction regulator 143 is configured to include a pair of leakage preventing side plates 145, a pair of connection plates 147, and a pair of grease loading pieces 149.

In flowing direction regulator 143, intermediate worm 29 is disposed between a pair of grease loading pieces 149. Tilt worm wheel 39 meshes with intermediate worm 29 exposed between a pair of grease loading pieces 149.

Flowing direction regulator 143 disposed in holder plate 77 is disposed in the vicinity of the meshing portion between intermediate worm 29 and tilt worm wheel 39. Flowing direction regulator 143 functions to guide grease extruded from the meshing portion to a tooth portion of tilt worm wheel 39. The grease guided to tilt worm wheel 39 is delivered to the tooth portion by the rotation of tilt worm wheel 39, and returns to flowing direction regulator 143.

Next, an operation of the configuration according to Modification Example 2 will be described. In the pan tilt drive device (pan drive device 200B and tilt drive device 300B) according to Modification Example 2, holder plate 77 has flowing direction regulator 143 which is disposed in the vicinity of the terminal worm wheel and intermediate worm 29 which mesh with each other in the meshing portion so as to guide the grease extruded from the meshing portion to the tooth portion of the terminal worm wheel.

According to the pan tilt drive device, flowing direction regulator 143 can efficiently return the grease extruded from a gear portion of terminal worm wheel (pan worm wheel 19 and tilt worm wheel 39) to the meshing portion between the terminal worm wheel and intermediate worm 29.

Hitherto, various embodiments have been described with reference to the drawings. However, as a matter of course, the present disclosure is not limited to the examples. Those skilled in the art will appreciate that various modification examples or correction examples are conceivable within the scope described in claims. As a matter of course, it will be understood that the examples fall within the technical scope of the present disclosure.

For example, in the above-described configuration example, a case has been described in which the gear meshing with the worm is a worm wheel. However, the present disclosure can adopt a configuration in which the gear meshing with the worm is a helical gear or a screw gear. In addition, a case has been described in which the monitoring camera includes two of the pan drive device and the tilt drive device as the pan tilt drive device. However, the present disclosure may adopt a configuration in which the monitoring camera includes either the pan drive device or the tilt drive device.

Therefore, according to "pan drive device 200 and tilt drive device 300", "pan drive device 200A and tilt drive device 300A", and "pan drive device 200B and tilt drive device 300B" which are the pan tilt drive devices of the present embodiment, backlash can also be reduced in the double stage reduction mechanism which includes a pair of the worm and the worm wheel and an additional pair of the worm and the worm wheel in order to increase the reduction ratio.

According to monitoring camera 100 of the present embodiment, each backlash of pan drive device 200, pan drive device 200A, and pan drive device 200B, and each backlash of tilt drive device 300, tilt drive device 300A, and tilt drive device 300B can be reduced. Therefore, it is possible to improve position accuracy of a preset operation. In addition, since the backlash can be reduced in monitoring camera 100, a clearance of the reduction mechanism is reduced when correction (so-called camera shake correction) is performed to prevent vibrations caused by wind. Therefore, it is possible to improve a tracking performance of a correction function in monitoring camera 100.

What is claimed is:

1. A pan tilt drive device comprising:
   a board;
   a drive worm that is rotatably supported by the board while a rotation center thereof is perpendicular to the board;
   a terminal worm wheel that is rotatably disposed relative to the board while a rotation center thereof is perpendicular to the board;
   a holder plate that has a planar portion facing the board;
   a shaft that is rotatably supported while a rotation center thereof is parallel to the holder plate;
   an intermediate worm wheel that is fixed to one end of the shaft, and that meshes with the drive worm;
   an intermediate worm that is fixed to the other end of the shaft, and that meshes with the terminal worm wheel;
   a pivot mechanism that supports the holder plate so as to be pivotable around a pivot center perpendicular to the board; and
   a biasing member that biases the holder plate in a direction close to the drive worm and the terminal worm wheel.

2. The pan tilt drive device of claim 1,
   wherein the pivot mechanism includes:
   a first holding hole that is drilled in the board;
   a spherical body whose one portion is fitted into the first holding hole; and
   a second holding hole that is drilled in the holder plate, and into which the other portion of the spherical body is fitted so as to pinch the spherical body in cooperation with the first holding hole.

3. The pan tilt drive device of claim 1,
   wherein the holder plate has a pair of holder side plates for supporting both ends of the shaft,
   wherein both ends of the shaft located outside from the holder side plate are supported by a pair of hinge plates,
   wherein a pair of the hinge plates are respectively supported so as to be swingable to the board by a spindle disposed in the same direction as the shaft, and
   wherein the biasing member biases a pair of the holder side plates in a swing direction in which the intermediate worm is moved close to the terminal worm wheel.

4. The pan tilt drive device of claim 1,
   wherein the holder plate fixes a separate reinforcement plate which extends along the shaft outside the intermediate worm wheel and which supports the shaft.

5. The pan tilt drive device of claim 1,
   wherein the holder plate has a flowing direction regulator that is disposed in the vicinity of a meshing portion in which the terminal worm wheel and the intermediate worm mesh with each other, and that introduces grease extruded from the meshing portion into a tooth portion of the terminal worm wheel.

6. A camera device comprising:
   the pan tilt drive device of claim 1;
   a pan housing that rotates around a pan rotation center, with respect to a camera base; and
   a tilt housing that rotates around a tilt rotation center orthogonal to the pan rotation center, with respect to the pan housing,
   wherein the board is a pan plate fixed to the pan housing, and
   wherein the terminal worm wheel is a pan worm wheel fixed to the camera base.

7. A camera device comprising:
   the pan tilt drive device of claim 1;
   a pan housing that rotates around a pan rotation center, with respect to a camera base; and
   a tilt housing that rotates around a tilt rotation center orthogonal to the pan rotation center, with respect to the pan housing,
   wherein the board is a tilt support plate supported by the pan housing, and
   wherein the terminal worm wheel is a tilt worm wheel fixed to a tilt shaft which rotates integrally with the tilt housing.

8. A camera device in which two of the pan tilt drive device of claim 1 are respectively provided as a first pan tilt drive device and a second pan tilt drive device, comprising:
   a pan housing that rotates around a pan rotation center, with respect to a camera base; and
   a tilt housing that rotates around a tilt rotation center orthogonal to the pan rotation center, with respect to the pan housing,
   wherein in the first pan tilt drive device, the board is a pan plate fixed to the pan housing, and the terminal worm wheel is a pan worm wheel fixed to the camera base, and
   wherein in the second pan tilt drive device, the board is a tilt support plate supported by the pan housing, and the terminal worm wheel is a tilt worm wheel fixed to a tilt shaft which rotates integrally with the tilt housing.

* * * * *